(12) United States Patent
Overton

(10) Patent No.: US 9,479,649 B2
(45) Date of Patent: Oct. 25, 2016

(54) METHOD AND SYSTEM FOR CALL DATA ANALYSIS

(71) Applicant: Metaswitch Networks Limited, Enfield, Middlesex (GB)

(72) Inventor: Mark Edward Overton, Middlesex (GB)

(73) Assignee: Metaswitch Networks Limited, Enfield, Middlesex (GB)

( * ) Notice: Subject to any disclaimer, the term of this patent is extended or adjusted under 35 U.S.C. 154(b) by 124 days.

(21) Appl. No.: 14/466,453

(22) Filed: Aug. 22, 2014

(65) Prior Publication Data

US 2015/0063124 A1    Mar. 5, 2015

(51) Int. Cl.
| | |
|---|---|
| *H04M 7/00* | (2006.01) |
| *H04M 3/22* | (2006.01) |
| *H04L 29/06* | (2006.01) |
| *H04L 1/24* | (2006.01) |

(52) U.S. Cl.
CPC ............ *H04M 7/0084* (2013.01); *H04L 1/246* (2013.01); *H04L 65/103* (2013.01); *H04L 65/104* (2013.01); *H04L 65/1043* (2013.01); *H04L 65/1083* (2013.01); *H04L 65/80* (2013.01); *H04M 3/2209* (2013.01); *H04M 3/2218* (2013.01); *H04M 3/2254* (2013.01)

(58) Field of Classification Search
None
See application file for complete search history.

(56) References Cited

U.S. PATENT DOCUMENTS

| | | | |
|---|---|---|---|
| 6,269,401 B1 * | 7/2001 | Fletcher .............. | G06F 11/3419 709/224 |
| 2005/0195850 A1 * | 9/2005 | Matsumoto ........... | H04L 1/0079 370/428 |
| 2006/0200711 A1 * | 9/2006 | Schondelmayer .. | H04L 43/0847 714/712 |
| 2009/0182533 A1 | 7/2009 | Neuenschwander et al. | |
| 2011/0060948 A1 * | 3/2011 | Beebe ................. | H04L 43/0817 714/37 |
| 2013/0159510 A1 * | 6/2013 | Cahill ..................... | H04L 69/28 709/224 |
| 2014/0331092 A1 * | 11/2014 | Taylor ................. | G06F 11/0787 714/48 |

FOREIGN PATENT DOCUMENTS

EP       1249986 A3    10/2002

* cited by examiner

*Primary Examiner* — Yemane Mesfin
*Assistant Examiner* — Peter Chen
(74) *Attorney, Agent, or Firm* — Stetina Brunda Garred & Brucker

(57) ABSTRACT

The present invention provides a method and apparatus for collecting diagnostic messages and collating them into correlated groups to be matched to specific calls, to identify and diagnose issues with those calls.

21 Claims, 2 Drawing Sheets

METHOD AND SYSTEM FOR CALL DATA ANALYSIS

CROSS REFERENCE TO RELATED APPLICATIONS

The present application claims priority to UK Patent Application No. 1315517.1 filed Aug. 30, 2013, the entirety of the disclosure of which is expressly incorporated herein by reference.

STATEMENT RE: FEDERALLY SPONSORED RESEARCH/DEVELOPMENT

Not Applicable.

FIELD OF THE INVENTION

This invention relates to the correlation of call data generated during operations such as call set up and tear down in communication systems to aid analysis of call issues.

BACKGROUND

ISDN (Integrated Services Digital Network) and ISUP (ISDN User Part—part of Signalling System no. 7, SS7) are sets of communication standards for making calls in a telecommunications network. ISUP and ISDN calls involve two key elements: an exchange of signalling messages to set up and tear down the call, and media for carrying the voice or data (e.g. fax) traffic.

The signalling for these protocols is described as out-of-band. That is, the signalling and media do not use the same TDM timeslot (DS0/E0). Media is carried in a unique DS0 (E0) channel but the signalling is carried separately. In the case of ISUP and NFAS (Non-Facility Associated Signalling) ISDN PRI, the signalling may use a different TDM carrier (T1/E1) altogether, even a different Media Gateway. A TDM carrier includes a number of separate DS0 or E0 channels. In the case of SS7 (Signalling System 7), rather than transporting the signalling over TDM, it is transported out of band over IP using M2PA (Message Transfer Part 2 Peer-to-Peer Adaptation Layer) or point-to-point M3UA (Message Transfer Part 3 User Adaptation Layer).

FIG. 1 shows an example of the connections in a typical SS7 network. The signalling messages are typically provided to and utilised by a Feature Server or Media Gateway Controller. A Media Gateway Controller is used to control Media Gateways. It also has some other signalling (ISUP, ISDN, etc.) that it uses to work out what media paths to set up. A Feature Server would include the function of a Media Gateway Controller but it would also have capabilities to provide subscriber call features (e.g. speed dial functionality). In the present application references to Media Gateway Controller refer to either a Media Gateway Controller or a Feature server providing that functionality. Furthermore, it may also encompass its role as a Signalling End Point in an SS7 network, rather than just a Signalling Transfer Point (STP).

This Feature Server/Media Gateway Controller determines how to set up a call and uses a control protocol such as H.248 to program the necessary connectivity and attributes to a Media Gateway which terminates one end of the media TDM carrier to establish the media path. The signalling exchange includes identifiers understood by the Media Gateway Controllers at each end that ultimately map to the TDM timeslots used for media. Where the signalling is transported over TDM, it is transported through, but not consumed by, a Media Gateway.

Diagnosing problems with a call can require analysis of both signalling and media information which, as described above, can involve several hardware elements, each arranged such that they only have partial knowledge of the overall position.

In addition, when there has been a problem with a call, the report of the problem usually only includes minimal details, such as the called/calling number and time of call.

Both of these issues present a problem that would usually require piecing together configuration and traces from several network elements to attempt to provide a consolidated view of all aspects of call setup and tear down needed for diagnosis of the causes and remedies of a specific problem. For example, a Media Gateway Controller (MGC) has configuration correlating ISUP Circuit Identification Codes (CICs) or ISDN Channel Identifiers with particular TDM timeslots on a particular Media Gateway, e.g. via the H.248 TerminationId parameter.

However, when a failed call is reported, and an attempt to analyse the causes and issues with the call, only limited access to parts of the network may be available and it may not be possible to access all of the information about a call. The analysis may be based on only a small portion of the network and so only information within the scope of that analysis will be available. The scope of the monitored network may only include one of two elements and might not include any MGCs at all, and so the potential diagnostic information in the MGCs might not be available. This can make it difficult to provide useful diagnostic information based on the passage and progress of a call in a part of a network excluding an MGC.

SUMMARY OF THE INVENTION

It is therefore desirable to produce consolidated diagnostics tying together ISUP/ISDN signalling information as well as H.248 programming and other relevant call event information for specific CICs/CRVs, using only information from one or more of the Media Gateways. Examples of relevant call event information may include individual DTMF digit or fax tone detection in the media stream or continuity test tones (media tones played from one end of the TDM link to another, as part of some call setup process to confirm the media path is actually good enough to use for the call). Such tones are transmitted in the media stream rather than as signalling data. In other words, media path related events may be collected and may also provide useful diagnostic information.

Therefore according to the present invention, there is provided a call data analysis method comprising: receiving a plurality of diagnostic data messages from one or more media gateways, said diagnostic data messages including a plurality of parameters including at least timestamp information and identifier information; correlating said diagnostic data messages into one or more trails, each trail including a plurality of diagnostic data messages having matching timestamp information and identifier information; determining a pairing confidence value for each of one or more pairs of said trails by comparing the identifier information of one trail of each pair with the identifier information of the other trail of said pair; receiving a request for diagnostic information relating to a call, said request including a search parameter; identifying a primary trail having one or more diagnostic data messages with parameters having values matching the search parameter; and identifying one or more secondary trails having a pairing confidence value with said primary trail in excess of a target level; and outputting said primary trail and said one or more secondary trails.

The method preferably further comprises adjusting said pairing confidence value of a pair of trails based upon at least one of the similarity of the timestamp information of each trail of a pair; and the relational strength of matching signalling identifier information and media timeslot identifier information of respective trails of a pair. This allows a more refined pairing confidence value to be determined.

Preferably, the relational strength of matching respective signalling identifier information and media timeslot identifier information is determined by: comparing sequential identification values for one trail type to sequential identification values for another trail type to determine a mapping between the identification values of the trail types; using the determined mapping to compare respective identifier information of each trail of a pair of trails to determine the relational strength. This provides a further way of enhancing the matching of trails which might not otherwise be possible. Whilst not always guaranteed to correctly match events, this heuristic approach provides a good approximation to a match.

Timestamp information of two diagnostic data messages can be considered to be matching when the timestamp is within a predetermined tolerance.

Only one secondary trail may be output rather than several. This can be selected as the secondary trail having the highest confidence value for its pairing with the primary trail.

When said primary trail is a signalling trail, the output may also provide one or more tertiary trails, received from a different media gateway and having a confidence value above a predetermined level. The predetermined level can be based upon the highest confidence value of the pairs of trails which include the primary trail.

The correlating of said diagnostic data messages into one or more trails can be partially carried out in one or more media gateways. In other words, rather than all the correlation being done in the analysis server, the media gateways may initially correlate some of the diagnostic data messages in partial trails or pre-trails before sending them to the analysis server to complete the correlation into trails.

The present invention also provides a call data analysis system comprising: a receiver adapted to receive a plurality of diagnostic data messages from one or more media gateways, said diagnostic data messages including a plurality of parameters including at least timestamp information and identifier information; a correlator arranged to correlate said diagnostic data messages into one or more trails, each trail including a plurality of diagnostic data messages having matching timestamp information and identifier information; a comparator arranged to compare the identifier information of one trail of a pair of said trails with the identifier information of the other trail of said pair to determine a pairing confidence value for said pair; a request receiver adapted to receive a request for diagnostic information relating to a call, said request including a search parameter; a trail analyser for identifying a primary trail having one or more diagnostic data messages with parameters having values matching the search parameter; and a second trail analyser for identifying one or more secondary trails having a pairing confidence value with said primary trail in excess of a target level; and an output arranged to output said primary trail and said one or more secondary trails.

Preferably, the comparator adjusts said pairing confidence value of a pair of trails based upon at least one of: the similarity of the timestamp information of each trail of a pair, and the relational strength of matching signalling identifier information and media timeslot identifier information of respective trails of a pair.

The relational strength of matching respective signalling identifier information and media timeslot identifier information can be determined by: comparing sequential identification values for one trail type to sequential identification values for another trail type to determine a mapping between the identification values of the trail types; using the determined mapping to compare respective identifier information of each trail of a pair of trails to determine the relational strength.

The timestamp information of two diagnostic data messages may be considered to be matching when the timestamp is within a predetermined tolerance.

The output may only output one secondary trail, being the one having the highest confidence value with the primary trail.

Where the primary trail is a signalling trail, the output may provide one or more tertiary trails, received from a different media gateway and having a confidence value above a predetermined level. The predetermined level can be based upon the highest confidence value of the pairs of trails which include the primary trail.

Some of said diagnostic data messages which are received may be grouped together by a media gateway. The correlator preferably can then include each grouped set of diagnostic data messages into one trail along with any other diagnostic data messages having matching timestamp information and identifier information.

BRIEF DESCRIPTION OF THE DRAWINGS

A specific embodiment of the invention will now be described by way of non-limiting example, in which.

DETAILED DESCRIPTION OF THE INVENTION

In the embodiment of the invention, an analysis server is used to collect data generated during the course of messaging events taking place within some or all of a communication system.

Ideally, to get a full picture of a call along its end to end path, it would be useful to have complete information about all the associated signalling and media messages as well as other diagnostic information. However, it will be appreciated that a call may pass across several systems which have no unified control and so collecting all the desired information would be difficult if not impossible. In reality, the operator of a portion of a network is probably only interested in the diagnosis of issues within that portion of the network over which they have control. Therefore, even though the analysis server may not have access to all the data generated by all parts of the communication system, it can nonetheless still collect data about some of the transactions within a certain scope of the entire network path. It can then provide information about the passage of calls through the network within its scope.

During the course of a call, a number of signalling and media messages will be generated and passed through the network. These messages may be passed through various different paths through the network, before reaching their destination. As indicated above, signalling and media messages may pass over different paths through the network and have different message formats and parameters.

As these messages are received and either consumed or relayed on through each network node, elements of the message are collected and passed on to the analysis server. As will be explained below, the messages may initially be consolidated with other related messages before being sent to the analysis server. The analysis server receives and collects messages to allow subsequent analysis to identify all messages that relate to or might relate to a specific call, to allow analysis of the processing of the call and possibly why a call failed or had difficulties connecting etc.

Figure 1:
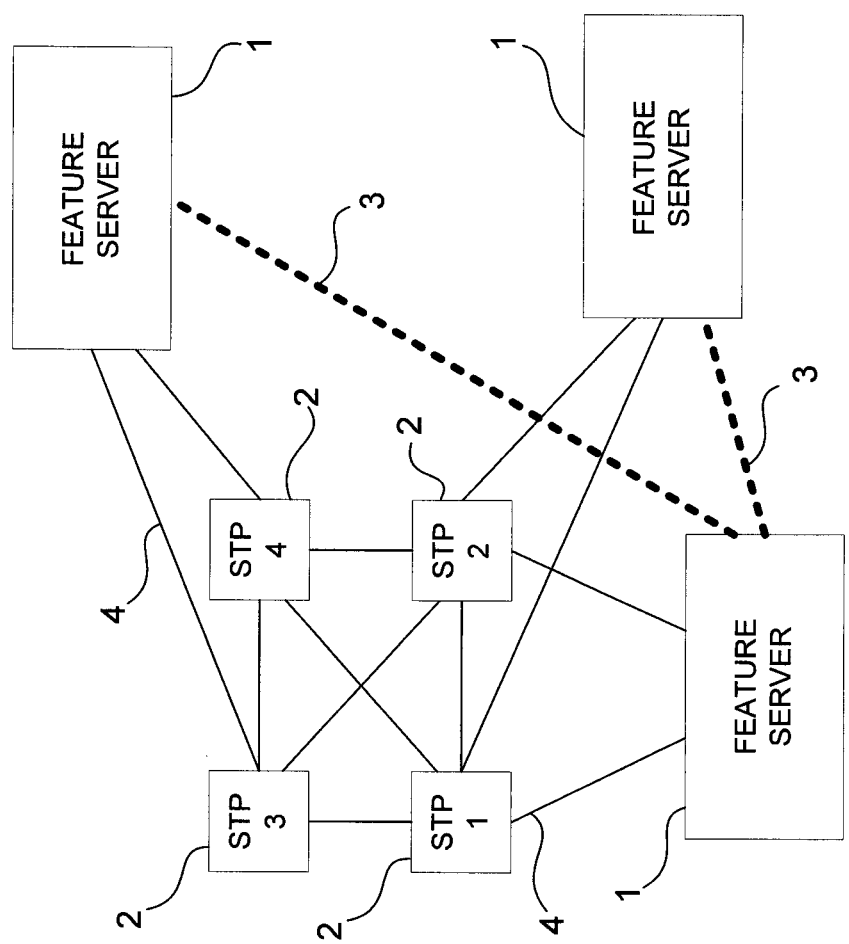
FIG. 1 shows the connections in an SS7 network.
Figure 2:
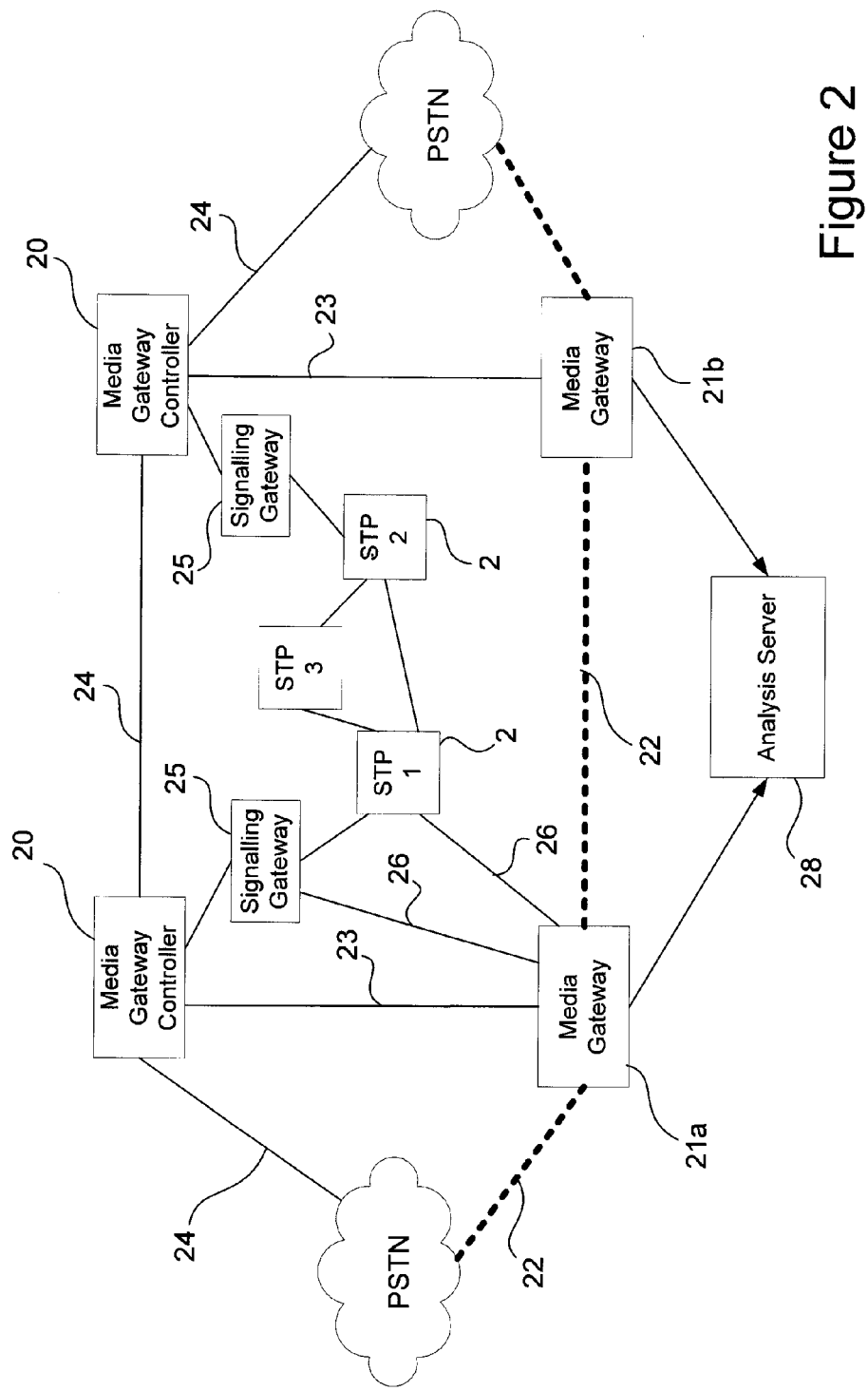
FIG. 2 shows a portion of a simplified network from which data can be collected.

FIG. 2 shows a portion of a theoretical network which is within the scope of the statistical analysis server of the present invention. As indicated above, the analysis server may only have access to a portion of the network over which a particular call may pass but this does not prevent analysis of the routing of the call in this portion. In the network, signalling messages 24 and media messages 22 may be passed through completely different channels depending on the specific transmission protocols being used.

A Media Gateway (MG) 21a, may receive media messages via TDM channels 22 from a PSTN which it passes along to MG 21b. It may also receive signalling messages 23 from a Media Gateway Controller (MGC) 20. The MG 21a may also receive signalling messages 26 which it relays between the Signalling Gateway 25 and the STPs 2. The reception and transmission of all these messages each represents an event which may provide useful diagnostic information. The MGs may also listen to the media content of the messages, for example to detect fax tones. This media sourced information may also be collected. Other information may also be collected which might not relate directly to a message. For example, a time-out event may provide additional information which can be used for diagnosis.

The Media Gateways 21a, 21b collate the diagnostic event information and pass this to the analysis server. The PSTN portions shown in FIG. 2 may be third party networks which are out of the scope of the network monitored by the analysis server. Equally the MGCs 20 may be out of the scope of the monitored network.

The analysis server 28 uses the received messages to produce consolidated diagnostics, tying together signalling events and media events (e.g. fax tone detection) from one or more Media Gateways within the scope of its network. Use of the collated data, allows searching based on certain parameters such as time of call, a unique identifier for the TDM timeslot involved (e.g. the H.248 TerminationId), ISUP/ISDN signalling message parameters (e.g. the CIC/Channel ID, the Called/Calling Party Number, etc.). The time of a call and Called/Calling Party Number are perhaps the most likely details to be provided about a call when an issue has occurred. Therefore these items provide a good key to tie all the data collected to a particular call. However, this information may not be present in all messages collected by the server and so messages must be tied together using other data which may then link them to a particular call to be matched. Furthermore, matching according to a timestamp and called/calling number requires no knowledge of any configuration on any of the network elements.

In the following description, a piece of diagnostic information (e.g. "H.248 message received: <message contents>") will be referred to as an "event". As indicated above, events may not just relate to messages received, sent or relayed but also to the consequences of the content of a message, or even some action taking place solely within an element of the system such as an MG, e.g. a time-out event. The system also makes use of "markers" which are a special type of diagnostic information containing information that can help with searching and/or correlation. These are similar to events but do not necessarily relate to a specific occurrence such as a result of a call setup or of a message reception or transmission. They may simply be diagnostically useful information that has been generated or calculated by an element of the system. They are particularly used for correlating diagnostic data together and to provide indexing information for searching using enquiry data.

Events and markers may be correlated with each other and these correlated events and markers may be grouped together into "trails". Such trails will be used as a set of linked events and markers which may then be associated with a particular call either directly or by association based on a significance measure relating to the likelihood of them relating to each other.

The media gateways within the system are configured to send events and markers to the analysis server. Each event is sent with a UTC timestamp generated by the media gateway and a media gateway identifier. The identifier should be unique at least within the scope of the analysis server.

The events and markers are grouped according to their parameters into trails. The trails are collated according to their source and then according to time based parameters and ID parameters.

In a first trail grouping for media path related messages, all events associated with a single TDM timeslot will be associated. As there may be a large number of unrelated calls using identical TDM timeslots, further criteria must be used to distinguish between different trails. In this case, this is achieved according to the Gateway Control Protocol messages received that are used to set up or tear down a media path. For H.248, these are 'ADD' and 'SUBTRACT' commands respectively. Each trail therefore contains markers having the following identical or similar parameters:

$T_{start}$=timestamp of the ADD command
$T_{end}$=timestamp of the SUBTRACT command
ID=created from the combination of the Gateway Control Protocol identifier for the TDM timeslot (e.g. the H.248 'TerminationId' parameter) and the media gateway's own unique ID
TID=Timeslot within a given TDM carrier (E1/T1)

As indicated above, all the markers in a trail might not have identical values for the parameters but may instead include markers that have values within a certain tolerance. For example, markers with $T_{start}$ within a certain margin of a value for the trail will be included.

Each media gateway performs the correlation of events for a single TDM timeslot. Since not all events are related to or consequences of messages, they may not inherently have a timeslot identifiers (e.g. H.248 TerminationId). As the analysis server needs such timeslot identifiers to associate events, if all events did not have them, then correlation would not be possible. Therefore, some correlation is done at the MG where it can associate each event with a corresponding timeslot identifiers and begin the process of grouping events into trails. Then when the partial trails are processed with other events and markers at the analysis server, complete trails can be constructed.

The partial trails are constructed at the MGs in this embodiment and then sent to the analysis server. The MG could instead add additional timeslot identifiers to each event and then send it to the analysis server so that the analysis server had sufficient information to complete the correlation process for all events/markers. However, this would add to the signalling overhead and it is therefore more efficient to form the partial trails at the MG, as in this embodiment.

In a second trail grouping, all events associated by their ISUP message MTP3 routing label and their ISUP Circuit Identification code parameters are included in a given trail. These are common elements in every ISUP message. Again, there may be many unrelated calls using the same label, and so further criteria must be used to distinguish between different trails. So for an event to be included in a given trail it must also be matched by call establishment and tear-down details, e.g. 'IAM'/'RELEASE' message timestamps respectively. Alternatively, the 'RELEASE COMPLETE' timestamp could be used for tear-down.

In this way, a single ISUP trail should only contain the messages for a single ISUP call (or attempt). Each trail therefore contains markers having the following identical or similar parameters:

$T_{start}$=timestamp of the IAM command message
$T_{end}$=timestamp of the RELEASE (or RELEASE COMPLETE) command message
ID=the combination of MTP3 routing label and circuit identification code (CIC). The CIC uniquely identifies a TDM timeslot as a media link between two feature servers/gateway controllers, and the MTP3 routing label identifies the pair of feature servers uniquely within a given SS7 network (but not globally).

Additionally, other markers may be associated with a trail that can help when searching for the call diagnostics. For example, this might include any ISUP parameters that might aid in linking a call to a particular trail, in particular: called party number and calling party number parameters.

Unlike the TDM timeslot trail grouping above, trail-grouping operations using ISUP parameter markers can be done either by the media gateway or the analysis server. However, it would likely be preferable to do the ISUP grouping at the analysis server since each individual message may be routed via a different signalling link on a different TDM timeslot, and so potentially on a different media gateway.

For ISUP media trunks between two media gateways in the same deployment sending to the same analysis server, it is likely that each ISUP message will be logged and sent to the analysis server more than once. Even so, they will be correlated with each other and still be associated into the same signalling trail.

In a further trail grouping, events associated by their ISDN call-related messages can be grouped. This can include using the Call Reference Information Element and a unique PRI identifier. The Call Reference Information Element is assigned by the originator of a call. The value is assigned at the beginning of a call and remains fixed for the lifetime of a call. After a call ends, the associated call reference value may be reassigned to a later call. The PRI consists of an ID assigned by the media gateway (for example the IUA identifier) and the media gateway's own unique identifier.

Again, the trails are further distinguished based on the time based parameters, as for ISUP above. In this case the trails are distinguished by reference to the timestamps for the SETUP and RELEASE/RELEASE COMPLETE commands.

In this way, a single ISDN trail should only contain the messages for a single ISDN call (or attempt). Each trail therefore contains markers having the following identical or similar parameters:

$T_{start}$=timestamp of the SETUP command message
$T_{end}$=timestamp of the RELEASE (or RELEASE COMPLETE) command message
ID=the combination of the Channel ID from the SETUP command message and the media gateway identification parameter by which the trail was first grouped.

Other markers may be associated with a trail to aid searching for a call's diagnostic events. For example, these could include markers with ISDN Information Elements that could be of interest for searching, in particular those with called party number and calling party number parameters.

Again, trail grouping operations using ISDN parameter markers can be done either by the media gateway or the analysis server.

Once the initial allocating of events/markers to trails is done either in the media gateways or in the analysis server itself, the "signalling" (ISUP, ISDN) and "media" (media gateway TDM termination) trails are then compared and an attempt to associate or correlate pairs of trails is carried out.

This second stage matching is carried out by identifying possible ID pairings for future lookup and allocating a confidence value indicating the "strength" of that pairing, i.e. a measure of certainty. In other words, pairs of trails are compared and the strength of the pairing determined to allocate a confidence value to that pairing.

Various factors are used to determine that "strength" of pairing, including:

Both $T_{start}$ and $T_{end}$ for two compared trails are within a certain tolerance (the tolerance could be configured on the analysis server, for example, 500 ms)
ID relational strength The ID Relational strength is determined based on ranging the signalling ID and the media TID. It is reasonable to assume that in most cases an entire TDM carrier (E1/T1) is being used for the relevant signalling protocol. On that basis, for the media gateway, if timeslot TID=3 serves ISUP CIC=27 then it is a reasonable assumption to suggest that timeslot TID=1 serves ISUP CIC=25, TID=2 serves ISUP CIC=26 and so on. In other words, in this example, TID=n serves ISUP CIC=24+n. Similarly for ISDN, if timeslot TID=5 is serving B-Channel 5, then it can be reasonably surmised that timeslot TID=6 is serving B-Channel 6 and so on.

In this way, if the TID and deduced corresponding ISUP CIC or ISDN B channel match, then the pairing strength or confidence value of the two trails being compared is enhanced.

In the above correlation process, the source media gateway for the trails is not taken into account, allowing for the SS7 network separation of signalling and media paths across different gateways.

Once the correlated data for the trails is collected in the analysis server, diagnostic analysis for a specific call can be carried out. A user can request diagnostic information by searching the database for a given marker (or set of markers), such as time of a call being initiated. Using this, a trail having data matching the given marker can be identified. The trail containing the marker found, the "main" trail, can then be used to identify associated trails. Using the confidence value associated with respective pairings which the main trail has with other trails, candidate associated trails can be identified. A threshold can be set for the confidence value above which candidate trails qualify as associated trails, i.e. trails having sufficiently high strength pairings from the second stage analysis above.

The threshold mentioned above can be set high if the user only wishes to see highly correlated trails or the threshold may be set lower, so that more trails are identified but with lower confidence of them relating to the desired call.

Once the main and qualifying associated trails have been identified, they can be collated and provided to the user. They can then be used for diagnosis purposes either manually by the user or using an automated process which may include remedial steps to try to rectify any problems identified.

If the main trail is a signalling trail (e.g. ISUP, ISDN), then additional media trails (e.g. media gateway TDM termination) may be included in the results. These additional media trails are selected where their confidence value is less than the confidence value of the highest strength trail pairing but within a certain amount and which are from a different media gateway. This allows for media trunks between two media gateways in the same monitored portion of the network (i.e. sending to the same diagnostics server). For example in the arrangement of FIG. 2 both Media Gateways 21a and 21b might be within the scope of the monitored scope. As such, both MGs might be sending events/marker information to the analysis server. In this situation, each MG could produce its own separate media trail, but there would only be one signalling trail. All three trails could be associated with each other so that the user could see all three trails together.

The trails described above can be made larger, for example by the media gateway tying together all events associated with a single H.248 context ID. This larger group of trails would be useful if identifying data relating to an ISUP call passed through a media gateway in tandem, as a single correlated diagnostic trace. This would happen, for example, where an ISUP IAM is received by an MGC that causes it determine that a call is not to be routed to a local subscriber but instead sent out over another ISUP trunk. In this case, there are two separate "branches" to that call, each of which has a separate TDM timeslot into one of the MGs controlled by the MGC. The gateway control protocol necessarily involves programming a path to connect them, either as two TDM terminations in a single H.248 context (e.g. if they are on the same MG) or with some other hop (e.g. RTP) in between.

The analysis server may include the ability to modify the pairing process by obtaining user input to adjust the pairing decision making. For example, trail pairings may be presented to the user to confirm the legitimacy of that pairing. This may be done for all pairings irrespective of the confidence value or limited trail pairings that have a confidence value that is just above or just below the threshold, within a certain range of the confidence value threshold. The user may indicate the desirable trail pairings and reject those that were not. This selection would then be passed to the analysis server to adjust the pairing decision making process.

The user response can then be used to modify the threshold value or to modify the significance of specific relationships. So, if a user confirms a particular pairing, the strength for that pairing (and associated relational pairings) is increased significantly, and all other possible pairings involving the main trail's "ID" can be removed.

Equally, if a user rejects a presented pairing, that pairing is removed and the strength for associated relational pairings is reduced. The process may then move on to the next best match or a list of possible pairings to choose from.

The analysis server may further include the ability to modify the pairing process by modifying the strength value associated with a relationship over time. In this way, the strength would decrease with time, so if a given TDM carrier is repurposed for a different ISUP trunk, newer possible pairings generated will be stronger than older ones as their strength will have decayed. In this way, newer pairings will have higher confidence values than older ones which will devalue over time. Thus an older trail for a repurposed TDM carrier will have a lower confidence value. The rate at which the strength reduces can depend on a number of factors such as usage and a configured decay rate.

The present invention can be extended to cover any out-of-band TDM-transported signalling protocol where the media gateway transports but does not consume the data, for example BSSAP (BSS Application Part), which also uses SS7.

The present invention provides a means to correlate trails even when the signalling trails are on a completely different gateway to the media. However, so that the trails can be correlated, they do need to use a consistent time reference, such as NTP. So, if the gateways involved are NTP-synced, it doesn't matter which gateway the different trails come from.

What is claimed is:

1. A call data analysis method performed by an analysis server comprising:
   receiving a plurality of diagnostic data messages from one or more media gateways on the analysis server, said diagnostic data messages including a plurality of parameters including at least timestamp information and identifier information;
   correlating, on said analysis server, said diagnostic data messages into one or more trails, each trail including a plurality of diagnostic data messages having matching timestamp information and identifier information;
   determining, on said analysis server, a pairing confidence value for each of one or more pairs of said trails by comparing the identifier information of one trail of each pair with the identifier information of the other trail of said pair;
   receiving, on said analysis server, a request, from a user, for diagnostic information relating to a call, said request including a search parameter;
   identifying, with said analysis server, a primary trail having one or more diagnostic data messages with parameters having values matching the search parameter; and
   identifying, on said analysis server, one or more secondary trails having a said respective pairing confidence value with said primary trail in excess of a target level, said target level being modifiable in response to a user indicating either desirability or rejection of said pairing; and
   outputting from said analysis server to said user, said primary trail and said one or more secondary trails.

2. A method according to claim 1, further comprising adjusting said pairing confidence value of a pair of trails based upon at least one of:
   the similarity of the timestamp information of each trail of a pair; and
   the relational strength of matching signalling identifier information and media timeslot identifier information of respective trails of a pair.

3. A method according to claim 2, wherein the relational strength of matching respective signalling identifier information and media timeslot identifier information is determined by:
comparing sequential identification values for one trail type to sequential identification values for another trail type to determine a mapping between the identification values of the trail types;
using the determined mapping to compare respective identifier information of each trail of a pair of trails to determine the relational strength.

4. A method according to claim 1, wherein said timestamp information of two diagnostic data messages is considered to the matching when the timestamp is within a predetermined tolerance.

5. A method according to claim 2, wherein said timestamp information of two diagnostic data messages is considered to be matching when the timestamp is within a predetermined tolerance.

6. A method according to claim 3, wherein said timestamp information of two diagnostic data messages is considered to be matching when the timestamp is within a predetermined tolerance.

7. A method according to claim 1, wherein only one secondary trail is output, said one secondary trail having the highest confidence value with the primary trail.

8. A method according to claim 1, wherein when said primary trail is a signalling trail, outputting one or more tertiary trails, received from a different media gateway and having a confidence value above a predetermined level.

9. A method according to claim 8, wherein said predetermined level is based upon the highest confidence value of the pairs of trails which include the primary trail.

10. A method according to claim 1, wherein the correlating of said diagnostic data messages into one or more trails is partially carried out in one or more media gateways.

11. A call data analysis system comprising:
a receiver adapted to receive a plurality of diagnostic data messages from one or more media gateways, said diagnostic data messages including a plurality of parameters including at least timestamp information and identifier information;
a correlator arranged to correlate said diagnostic data messages into one or more trails, each trail including a plurality of diagnostic data messages having matching timestamp information and identifier information;
a comparator arranged to compare the identifier information of one trail of a pair of said trails with the identifier information of the other trail of said pair to determine a pairing confidence value for said pair;
a request receiver adapted to receive a request, from a user, for diagnostic information relating to a call, said request including a search parameter;
a trail analyser for identifying a primary trail having one or more diagnostic data messages with parameters having values matching the search parameter; and
a second trail analyser for identifying one or more secondary trails having said respective pairing confidence value with said primary trail in excess of a target level, said target level being modifiable in response to a user indicating either desirability or rejection of said pairing; and
an output arranged to output, to said user, said primary trail and said one or more secondary trails.

12. A call data analysis system according to claim 11, wherein said comparator adjusts said pairing confidence value of a pair of trails based upon at least one of: the similarity of the timestamp information of each trail of a pair, and the relational strength of matching signalling identifier information and media timeslot identifier information of respective trails of a pair.

13. A call data analysis system according to claim 12, wherein the relational strength of matching respective signalling; identifier information and media timeslot identifier information is determined by:
comparing sequential identification values for one trail type to sequential identification values for another trail type to determine a mapping between the identification values of the trail types;
using the determined mapping to compare respective identifier information of each trail of a pair of trails to determine the relational strength.

14. A call data analysis system according to claim 11, wherein said timestamp information of two diagnostic data messages is considered to be matching when the timestamp is within a predetermined tolerance.

15. A call data analysis system according to claim 12, wherein said timestamp information of two diagnostic data messages is considered to be matching when the timestamp is within a predetermined tolerance.

16. A call data analysis system according to claim 13, wherein said timestamp information of two diagnostic data messages is considered to be matching when the timestamp is within a predetermined tolerance.

17. A call data analysis system according to claim 11, wherein said output only outputs one secondary trail, having the highest confidence value with the primary trail.

18. A call data analysis system according to claim 11, wherein when said primary trail is a signalling trail, said output outputs one or more tertiary trails, received from a different media gateway and having a confidence value above a predetermined level.

19. A call data analysis system according to claim 18, wherein said predetermined level is based upon the highest confidence value of the pairs of trails which include the primary trail.

20. A call data analysis system according to claim 11, wherein some of said diagnostic data messages received are grouped together by a media gateway and said correlator includes each group of diagnostic data messages in one trail along with any other diagnostic data messages having matching timestamp information and identifier information.

21. A non-transitory computer readable medium carrying a call data analysis program, executable in a processor of a call analysis system and which when executed, causes the processor to operate so as to:
receive, on said call analysis system, a plurality of diagnostic data messages from one or more media gateways, said diagnostic data messages including a plurality of parameters including at least timestamp information and identifier information;
correlate, on said call analysis system, said diagnostic data messages into one or more trails, each trail including a plurality of diagnostic data messages having matching timestamp information and identifier information;
determine, on said call analysis system, a pairing confidence value for each of one or more pairs of said trails by comparing the identifier information of one trail of each pair with the identifier information of the other trail of said pair;
receive, on said call analysis system, a request, from a user, for diagnostic information relating to a call, said request including a search parameter;

identify, with said call analysis system, a primary trail having one or more diagnostic data messages with parameters having values matching the search parameter; and identify, with said call analysis system, one or more secondary trails having a said respective pairing confidence value with said primary trail in excess of a target level, said target level being modifiable in response to a user indicating either desirability or rejection of said pairing; and output, from said call analysis system, said primary trail and said one or more secondary trails.

\* \* \* \* \*